US008748540B2

(12) United States Patent
Ulcar et al.

(10) Patent No.: US 8,748,540 B2
(45) Date of Patent: Jun. 10, 2014

(54) COMPOSITIONS COMPRISING SOLVATED AROMATIC AMINES AND METHODS FOR THE PREPARATION THEREOF

(75) Inventors: John Ulcar, Mississauga (CA); Ackah Toffey, Brampton (CA)

(73) Assignee: Crosslink Technology, Inc, Mississauga, Ontario ( * ) Notice: Subject to any disclaimer, the term of this patent is extended or adjusted under 35 U.S.C. 154(b) by 27 days.

(21) Appl. No.: 13/264,962

(22) PCT Filed: Apr. 16, 2010

(86) PCT No.: PCT/CA2010/000585
§ 371 (c)(1),
(2), (4) Date: Oct. 24, 2011

(87) PCT Pub. No.: WO2010/118527
PCT Pub. Date: Oct. 21, 2010

(65) Prior Publication Data
US 2012/0040094 A1  Feb. 16, 2012

(30) Foreign Application Priority Data
Apr. 17, 2009  (CA) ..................................... 2662982

(51) Int. Cl.
*C09D 175/12* (2006.01)
*B05D 7/22* (2006.01)
*C09K 3/00* (2006.01)

(52) U.S. Cl.
USPC ........... 525/395; 525/399; 525/472; 525/509; 525/510; 525/512; 427/230; 220/567.2

(58) Field of Classification Search
None
See application file for complete search history.

(56) References Cited

U.S. PATENT DOCUMENTS

| 3,060,137 | A | * | 10/1962 | Gemeinhardt et al. | ......... 264/54 |
| 3,194,793 | A | | 7/1965 | Kogon | |
| 3,563,906 | A | | 2/1971 | Hoeschele | |
| 3,677,869 | A | * | 7/1972 | Chung et al. | ...................... 267/3 |
| 3,736,295 | A | | 5/1973 | Meckel et al. | |
| 3,752,790 | A | | 8/1973 | McShane, Jr. et al. | |
| 3,846,351 | A | | 11/1974 | Huffaker et al. | |
| 4,002,584 | A | | 1/1977 | Takahashi et al. | |
| 4,017,464 | A | | 4/1977 | Kimball | |
| 4,044,811 | A | | 8/1977 | Dudek et al. | |
| 4,048,105 | A | | 9/1977 | Salisbury | |
| 4,090,547 | A | | 5/1978 | Schmidt | |
| 4,218,543 | A | | 8/1980 | Weber et al. | |
| 4,254,272 | A | | 3/1981 | Chung et al. | |
| 4,507,459 | A | | 3/1985 | Schmidt et al. | |
| 5,112,933 | A | | 5/1992 | O'Donnell et al. | |
| 6,046,297 | A | | 4/2000 | Rosenberg et al. | |
| 2003/0055192 | A1 | | 3/2003 | Palinkas et al. | |
| 2003/0065124 | A1 | | 4/2003 | Rosenberg et al. | |
| 2003/0203771 | A1 | | 10/2003 | Rosenberg et al. | |
| 2003/0225240 | A1 | | 12/2003 | Quint | |
| 2005/0124777 | A1 | | 6/2005 | Rosenberg et al. | |
| 2007/0142606 | A1 | | 6/2007 | Bojkova et al. | |
| 2007/0155941 | A1 | | 7/2007 | Nefzger et al. | |
| 2007/0276115 | A1 | | 11/2007 | Ou et al. | |

FOREIGN PATENT DOCUMENTS

| CA | 1255422 | 6/1989 |
| CA | 1315430 | 3/1993 |
| CA | 2486314 | 4/2006 |
| CA | 2522251 | 4/2006 |
| CN | 101100582 | 1/2008 |
| GB | 2 105 356 | 3/1983 |
| WO | 2008/138978 | 11/2008 |

OTHER PUBLICATIONS

International Search Report.
International Preliminary Report on Patentability.
Written Opinion of the International Searching Authority.

* cited by examiner

*Primary Examiner* — William Phillip Fletcher, III
(74) *Attorney, Agent, or Firm* — Duane Morris LLP

(57) ABSTRACT

The present invention provides a composition comprising a solvated aromatic amine and a liquid carrier, wherein said solvated aromatic amine is the reaction product of an aromatic amine and at least one of any anhydride, an isocyanate or an acid in the liquid carrier. The present invention also provides a method of preparing a composition comprising a solvated aromatic amine and a liquid carrier, said method comprising the steps of providing a reaction mixture comprising: a) an aromatic amine; b) at least one of an anhydride, an isocyanate or an acid; and c) a liquid carrier; and heating the reaction mixture at an elevated temperature to provide the solvated aromatic amine in the liquid carriers. The present invention further provides the use of the compositions for the preparation of the curable compounds and for gasoline resistant coatings.

20 Claims, 1 Drawing Sheet

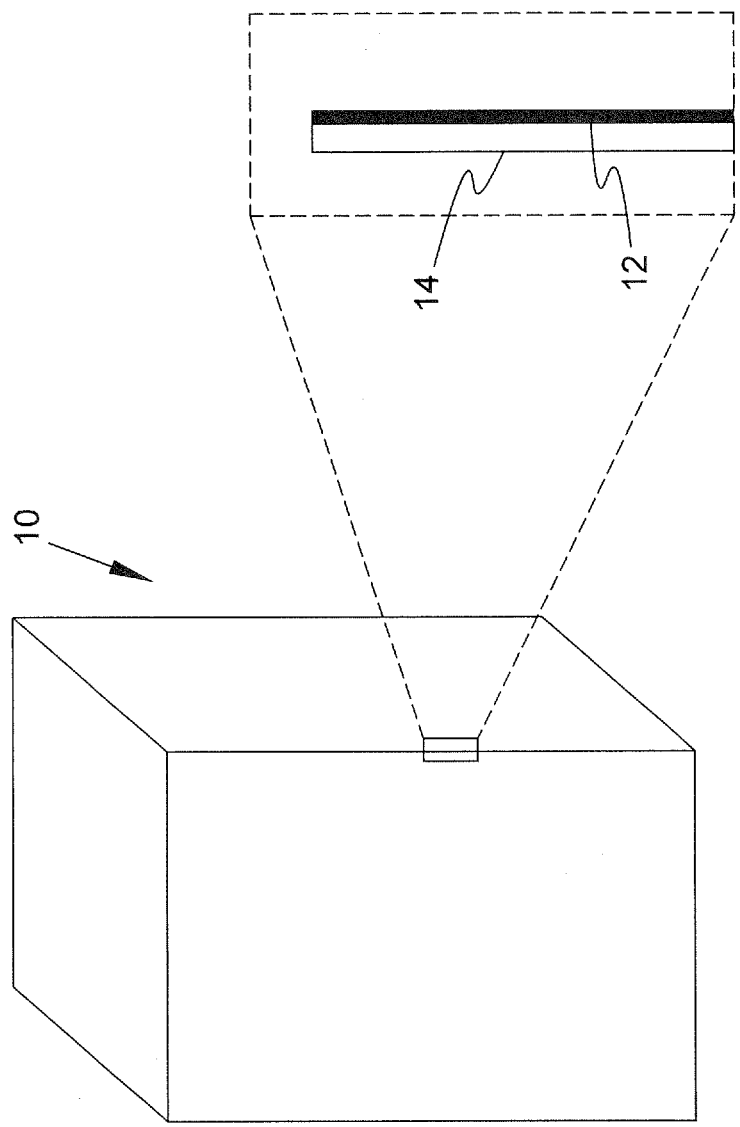

COMPOSITIONS COMPRISING SOLVATED AROMATIC AMINES AND METHODS FOR THE PREPARATION THEREOF

FIELD OF INVENTION

The present invention relates to compositions comprising solvated aromatic amines and methods for the preparation thereof. In particular, the invention relates to compositions comprising solvated aromatic amines useful in the preparation of polyurethanes and epoxy resins.

RELATED APPLICATIONS

This application claims priority from Canadian Patent Application No. 2,662,982 which was filed on Apr. 17, 2009, the entirety of which in hereby incorporated by reference.

BACKGROUND

Aromatic amines are commonly used in the preparation of hardeners for thermosetting resins such as polyurethanes and epoxy resins. Aromatic amines are solid at room temperature and generally not available in a liquid form at room temperature, thus making the processing of these materials in the preparation of polyurethanes and epoxy resins difficult. The use of aromatic amines typically requires a melt-into-resin technique, where the resin is preheated and the melted amine added to it. While this technique is industrially acceptable, the industry must contend with poor working lives of the resin-hardener mixture. In addition, such use of aromatic amines has many drawbacks including exposure to amine dust, heating requirements, and air entrapment.

Presently there are no commercially available products which are true solutions of aromatic amines but rather dispersions of finely powdered aromatic amine in very polar solvents or non reactive solvents having plasticizing or other deleterious effects. Dispersion products employing very polar solvents are difficult to handle as they tend to have very high vapour pressures and therefore susceptible to evaporation at ambient temperatures. Dispersion products employing non reactive solvents may adversely affect the properties of the resulting polyurethane or epoxy resins. When these dispersion products are used for the preparation of epoxy resins, the resulting materials are typically brittle and may have other undesirable properties. These dispersion products are also not suitable for the preparation of polyurethanes as they cure too fast with urethanes.

SUMMARY OF INVENTION

In one aspect, the present invention provides a composition comprising a solvated aromatic amine and a liquid carrier, wherein said solvated aromatic amine is the reaction product of an aromatic amine and at least one of an anhydride, an isocyanate or an acid in the liquid carrier.

In one embodiment, the aromatic amine is diphenyl aromatic amine, trimethylene glycol di-p-amino benzoate, methylene bis methyl anthranilate, methylene-bis chloroaniline, methylene bis chlorodiethylbenzamine or a combination thereof.

In a further embodiment, the anhydride is methylhexahydrophthalic anhydride, dodecenyl succinic anhydride, nadic methyl anhydride or a combination thereof.

In a further embodiment, the isocynate is methylene diisocyanate, toluene diisocyanate, isophorone diisocyanate or combinations thereof.

In a further embodiment, the acid is oleic acid or citric acid.

In a further embodiment, the liquid carrier is a non-volatile liquid carrier.

In a further embodiment, the non-volatile liquid carrier comprises castor oil, castor oil triol, di octyl phthalate, 2-ethylhexyl diphenyl phosphate, dibasic ester, di butyl phthalate, polyether polyol, caprolactone, propylene carbonate or combinations thereof.

In another aspect, the present invention provides a method of preparing a composition comprising a solvated aromatic amine and a liquid carrier, said method comprising the steps of:

providing a reaction mixture comprising:
  a) an aromatic amine;
  b) at least one of an anhydride, an isocyanate or an acid; and
  c) a liquid carrier;
heating the reaction mixture at an elevated temperature wherein the aromatic amine is solvated by the liquid carrier.

In one embodiment, the aromatic amine is diphenyl aromatic amine, trimethylene glycol di-p-amino benzoate, methylene bis methyl anthranilate, methylene-bis chloroaniline, methylene bis chlorodiethylbenzamine or a combination thereof.

In a further embodiment, the anhydride is methylhexahydrophthalic anhydride, dodecenyl succinic anhydride, nadic methyl anhydride or a combination thereof.

In a further embodiment, the isocynate is methylene diisocyanate, toluene diisocyanate, isophorone diisocyanate or combinations thereof.

In a further embodiment, the acid is oleic acid or citric acid.

In a further embodiment, the liquid carrier is a non-volatile liquid carrier.

In a further embodiment, the non-volatile liquid carrier comprises castor oil, castor oil triol, di octyl phthalate, 2-ethylhexyl diphenyl phosphate, dibasic ester, di butyl phthalate, polyether polyol, caprolactone, propylene carbonate or combinations thereof.

In a further embodiment, the amount of the aromatic amine in the reaction mixture is about 30% to about 60% w/w.

In a further embodiment, the amount of the aromatic amine in the reaction mixture is about 50% w/w.

In a further embodiment, the amount of the anhydride, the isocyanate or the acid in the reaction mixture is about 0.1% to about 10% w/w.

In a further embodiment, the amount of the anhydride or the isocyanate in the reaction mixture is about 1% to about 10% w/w.

In a further embodiment, the amount of the acid in the reaction mixture is about 0.5% to about 5% w/w.

In a further embodiment, the amount of the liquid carrier in the reaction mixture is about 30% to about 60% w/w.

In a further embodiment, the amount of the liquid carrier in the reaction mixture is about 50% w/w.

In a further embodiment, the elevated temperature is between about 100° C. to about 135° C.

In a further embodiment, the elevated temperature is about 110° C.

In a further embodiment, a nitrogen blanket is provided over the reaction mixture.

In further aspect, the present invention provides a composition comprising a solvated aromatic amine and a liquid carrier prepared in accordance with the method according to the present invention.

In a further aspect, the present invention provides a curable compound comprising:
a resin; and
a hardener, wherein said hardener comprises a composition comprising a solvated aromatic amine and a liquid carrier, and wherein said solvated aromatic amine is the reaction product of an aromatic amine and at least one of any anhydride, an isocyanate or an acid in the liquid carrier.

In one embodiment, the resin comprises isocyanate.

In a further embodiment, the isocyanate is methylene diisocyanate, toluene diisocyanate, isophorone diisocyanate, associated prepolymers thereof and combinations thereof.

In a further embodiment, the composition comprising the solvated aromatic amine and the liquid carrier is prepared in accordance with the method according the present invention.

In a further embodiment, the curable compound further comprises at least one low molecular weight polyol.

In a further aspect, the present invention provides a method of decreasing gasoline permeability of a container, comprising the steps:
coating an inside surface of the container with the curable compound comprising a resin; and a hardener, wherein said hardener comprises a composition comprising a solvated aromatic amine and a liquid carrier, and wherein said solvated aromatic amine is the reaction product of an aromatic amine and at least one of any anhydride, an isocyanate or an acid in the liquid carrier; and
curing the curable compound to provide a gasoline resistant coating.

In a further embodiment, the composition comprising the solvated aromatic amine and the liquid carrier is prepared in accordance with the method according to the present invention.

In a further embodiment, the gasoline resistant coating decreases gasoline permeability of the container to below about 1.5 g/m$^2$/day.

BRIEF DESCRIPTION OF THE DRAWINGS

Preferred embodiments of the invention will now be described, by way of example, with reference to the accompanying drawing, in which:

FIG. 1 is a perspective view of a gasoline container treated with a coating of the invention and an enlarged sectional view of a wall of the gasoline container.

DESCRIPTION

The present invention provides compositions comprising solvated aromatic amines and a liquid carrier. The compositions of the present invention overcome many of the problems associated with commercially available dispersions of aromatic amines. The compositions of the present invention are liquid at room temperature and do not require the use of volatile solvents. The compositions of the present invention are well suited for use in the preparation of thermosetting resins including polyurethanes and epoxy resins. The compositions of the present invention can also be used in preparation of melamine-based laminating resins.

The compositions are safe to use, easy to handle and have reasonable working lives.

The liquid carriers of the present invention do not suffer the same problems associated with the volatile solvents used in commercially available dispersion products. The liquid carriers of the present invention, as compared to the prior art solvents found in such dispersions products, do not act as plasticizers and can be used to prepare thermosetting resins, and in particular, epoxy resins having a desirable toughness. The liquid carriers of the present invention may also be selected to be reactive with commonly used isocyanate resins to provide cured products having additional desirable physical properties.

The compositions of the present invention can be used for the preparation of curable compounds. The curable compounds of the present invention are useful for the preparation of gasoline resistant coatings.

In addition to curative applications, the compositions of the present invention also find application in the preparation of paper and related products.

Previous attempts to provide liquid formulations of aromatic amines involved the use of very polar solvents or non reactive solvents having plasticizing effects, in the preparation of dispersions of aromatic amines. The prior art preparations are not amenable for industrial applications such as the preparation of thermosetting resins as the solvents were either highly volatile or negatively affected the physical properties of the cured product. The compositions of the present invention do not require the use of highly polar solvents or non reactive solvents having plasticizing effects.

The compositions of the present invention comprise a solvated aromatic amine and a liquid carrier. The solvated aromatic amine is the reaction product of an aromatic amine and at least one of an anhydride, an isocyanate or an acid in the liquid carrier. The reaction between the aromatic amine and the anhydride, isocyanate or acid is performed in the liquid carrier comprising the composition.

In one embodiment, the compositions of the present invention are prepared by providing a reaction mixture comprising: a) an aromatic amine; b) at least one of an anhydride, an isocyanate or an acid; and c) a liquid carrier. The reaction mixture is heated at an elevated temperature to provide the solvated aromatic amine in the liquid carrier.

The use of aromatic amines as hardeners for the preparation of thermosetting resins is well known in the art. One or more aromatic amines useful for the preparation of hardeners can be used to prepare the compositions of the present invention. In a preferred embodiment, the aromatic amine is a primary amine. In a further preferred embodiment, the aromatic amine is a diphenyl amine. In a still further preferred embodiment, the aromatic amine, may include, but is not limited to: trimethylene glycol di-p-amino benzoate (such as Versalink 740M, Air Products and Chemicals, Inc., Allentown, USA); methylene bis methyl anthranilate (such as Polycure 1000, PTM&W Industries, Inc., Santa Fe Springs, USA); methylene-bis chloroaniline (MOCA); methylene bis chlorodiethylbenzamine (such as Lonzacure MCDEA-GS, Basel, Switzerland); and combinations thereof.

In one embodiment, the solvated aromatic amine is the reaction product of an aromatic amine and an anhydride. When reacted together in the liquid carrier, the aromatic amine is chemically grafted onto the anhydride forming an amide salt which is soluble in the liquid carrier. In forming this salt, it has been determined that many desired properties of the original aromatic amine can be retained, such as pot life and certain physical properties. The amide salts can be prepared using monoanhydrides or dianhydrides. In a preferred embodiment, the anhydride includes simple alicyclic anhydrides such as phthalic anhydrides. In a still further preferred embodiment, the anhydride, includes, but are not limited to: methylhexahydrophthalic anhydride (MHHPA), dodecenyl succinic anhydride, nadic methyl anhydride, and combinations thereof.

In another embodiment, the solvated aromatic amine is the reaction product of an aromatic amine and an acid. When reacted together in the liquid carrier, the aromatic amine is chemically grafted onto the acid forming an amide salt which is soluble in the liquid carrier. As discussed above, the resulting amide salt retains many desired properties of the original aromatic amine. The amide salts can be prepared using acids including, but not limited to oleic acid and citric acid.

In another embodiment, the solvated aromatic amine is the reaction product of an aromatic amine and an isocyanate wherein the aromatic amine is chemically grafted onto the isocyanate. The reaction product is a prepolymer which is soluble in the liquid carrier. As with the amide salts discussed above, the resulting prepolymer retains many desired properties of the original aromatic amine. In a preferred embodiment, the isocyanate, includes, but is not limited to: methylene diisocyanate (MDI), toluene diisocyanate (TDI), isophorone diisocyanate (IPDI), prepolymers thereof, and combinations thereof.

The compositions of the present invention comprise a liquid carrier which is also the reaction medium for obtaining the solvated aromatic amine. The liquid carrier is preferably a non-volatile liquid carrier. The liquid carriers of the present invention provide the dual function of solvating the aromatic amines and maintaining desired properties of the original aromatic amine. The liquid carrier may also function as a co-reactant in subsequent applications of the liquid compositions, such as in the preparation of thermosetting resins.

The choice of the liquid carrier can be varied depending on the intended application of compositions of the present invention. In applications where the compositions are employed as hardener agents in the preparation of thermosetting resins, it may be desirable to employ liquid carriers having functional groups capable of reacting with resins to enhance the chemical and/or mechanical properties of the cured compound.

In a preferred embodiment, the liquid carrier is a non-volatile liquid carrier comprising polyols. The use of polyols may be particularly advantageous as its lactone groups are capable of reacting with aromatic amines and isocyanates. As such, liquid carriers comprising polyols can be used as both a carrier and as a co-reactant in the preparation of thermosetting resins such as polyurethanes and epoxy resins.

In a further preferred embodiment, the liquid carrier, includes, but is not limited to: caprolactone monomer (CAPA), castor oil, castor oil triol, di octyl phthalate, 2-ethylhexyl diphenyl phosphate, propylene carbonate, dibasic ester, di butyl phthalate, polyether polyol, and combinations thereof. In a further preferred embodiment, the liquid carrier is caprolactone monomer.

In a first step in preparing the liquid compositions of the present invention, a reaction mixture comprising: a) an aromatic amine; b) at least one of any anhydride, an isocyanate or an acid; and c) a liquid carrier is provided. The reaction mixture can be prepared by mixing the components in a suitable reaction vessel under ambient pressure. Typically, the aromatic amine will be in powdered or granular form with the other components being liquid. The liquid composition may optionally be prepared under a nitrogen blanket.

The relative amounts of each of the components comprising the reaction mixture may vary depending on the particular components selected, and the intended application of the resulting liquid composition.

In one embodiment, the reaction mixture may comprises about 30-60% w/w of the aromatic amine and more preferably, about 40 to 50% w/w of the aromatic amine and still more preferably about 50% w/w of the aromatic amine.

In another embodiment, the reaction mixture may comprises about 30-60% w/w of the liquid carrier and more preferably, about 40 to 50% w/w of the liquid carrier and still more preferably about 40% w/w of the liquid carrier.

In another embodiment, the reaction mixture may comprises about 0.1 to 10% w/w of the anhydride and more preferably, about 1 to 10% w/w of the anhydride and still more preferably about 2 to 10% w/w of the anhydride.

In another embodiment, the reaction mixture may comprises about 0.1 to 10% w/w of the isocyanate and more preferably, about 1 to 10% w/w of the isocyanate and still more preferably about 2 to 10% w/w of the isocyanate.

In another embodiment, the reaction mixture may comprises about 0.1 to 10% w/w of the acid and more preferably, about 0.5 to 10% w/w of the acid and still more preferably about 0.5 to 5% w/w of the acid.

In a further step in the preparation of the liquid compositions of the present invention, the reaction mixture is heated at an elevated temperature to provide the solvated aromatic amine in the liquid carrier. Preferably, the elevated temperature is between about 100 to 135° C. and more preferably about 110° C. The duration of the heating step will depend on the specific components used in the reaction mixture and may occur in two stages. In a first stage the reaction mixture is heated at the elevated temperature until the aromatic amine is no longer detectable by visual inspection and the reaction mixture is substantially clear. In a second stage, once a clear solution is provided, the reaction mixtures is held between 100 to 135° C. and more preferably about 110° C. In one embodiment, the duration of first and/or second stages of heating is preferably between about 5 to 60 minutes, more preferably between about 5 and 30 minutes and still more preferably about 10 minutes. Following heating, the resulting liquid composition can be cooled to room temperature prior to use in its intended application.

The liquid compositions of the present invention can be used for the preparation of curable compounds, and in particular, thermosetting resins such as polyurethanes and epoxy resins. In one embodiment, the curable compound comprises a resin and a hardener comprising the liquid composition of the present invention.

Conventional methods for the preparation of thermosetting resins such as polyurethanes and epoxy resins are well known in the art can be used to prepare the cured compounds of the present invention. In particular, conventional methods for preparing two part (i.e. resin and hardener) polyurethanes and two part (i.e. resin and hardener) epoxy resins can be used to prepare the cured compounds of the present invention.

The curable compounds of the present invention can be prepared using conventional resins which are known in the art for the preparation of thermosetting resins including polyurethanes and epoxy resins. In a preferred embodiment, the resins will be isocyanates, and more preferably methylene diisocyanate (MDI), toluene diisocyanate (TDI), isophorone diisocyanate (IPDI), prepolymers thereof, and combinations thereof. Aromatic amines which are known in the art as being useful as hardening agents can be used to prepare the solvated aromatic amine of the liquid composition. As discussed above, the solvated aromatics amines of the present invention retain desirable properties of the original aromatic amine. Accordingly, it will be appreciated that the person skilled in the art can select specific combinations of resin and aromatic amines based on conventional formulations for preparing polyurethanes and epoxy resins to provide curable compounds having desired chemical and physical properties.

The curable compounds of the invention may have improved chemical and physical properties over prior art compounds prepared using the same resin and aromatic amines. These properties can include a longer pot life which is typically in the range of 10 to 35 minutes for the curable compounds of the present invention. In addition, the resulting curable compounds of the present invention may be worked at much lower temperatures than were previously possible. With the use of conventional solid aromatic amines, the aromatic amines must be processed at 100° C. or higher (which adversely shortens pot life) to melt the aromatic amine into the resin. In contrast, the curable compounds of the present invention employ solvated aromatic amines in a liquid carrier which can be processed at room temperature. Accordingly, the use of the curable compounds of the present invention is more cost effective requiring substantially less energy consumption and as there is no requirement to melt the aromatic amines overnight as with conventional methods. Other improved properties of the curable compounds of the present invention may include mechanical properties such as the ability to withstand higher temperatures, impact abrasion resistance and increased resistance to degradation.

The curable compounds of the present invention have superior chemical resistance to gasoline as compared to prior art curable compounds prepared using the same resins and conventional polyol based hardeners. Commercially available aromatic amines are not processable in the preparation of conventional gasoline resistant coatings. When cured, the curable compounds of the present invention exhibit high impermeability to gasoline. The curable compounds of the present invention are useful for the preparation of gasoline resistant coatings which can be used to treat gasoline containers.

Gasoline containers are commonly made from polyethylene. Polyethylene is a preferred material for gasoline containers despite its permeability, because of its other physical and chemical properties, including resistance to decomposition. A typical gasoline container experiences a permeation rate of about >30 $g/m^2/day$, resulting in the loss of a considerable amount of gasoline vapour into the environment. The curable compounds of the present invention can be used to decrease gasoline permeability of a gasoline container to below about 1.5 $g/m^2/day$.

In one embodiment, a method of decreasing gasoline permeability of a container comprises the steps of: coating an inside surface of the container with a curable compound comprising a resin; and a hardener, wherein the hardener comprises a composition comprising a solvated aromatic amine in a liquid carrier, and wherein the solvated aromatic amine is the reaction product of an aromatic amine and at least one of any anhydride, an isocyanate or an acid in the liquid carrier; and curing the curable compound to provide a gasoline resistant coating.

The composition comprising the solvated aromatic amine and the liquid carrier can be prepared in accordance with the methods discussed above. In a preferred embodiment, the liquid composition may further comprise 4,4'-diaminodiphenyl sulfone.

In a further embodiment, the container is coated with an effective amount of the curative compound to yield a gasoline resistant coating which decreases gasoline permeability of the container to below about 1.5 $g/m^2/day$. Preferably, the applied coating will have a thickness of between about 0.2 to 0.6 mm and more preferably of about 0.4 mm.

FIG. 1 illustrates a typical gas container 10 having an inner wall 12. The method and curable compound described herein can be used to apply a coating 14 to the gasoline container 10, to reduce the permeability of the inner wall 12 to gasoline vapour.

A curable compound according to the present invention can be applied to the container inner wall 12 by various conventional means. For example, the curable compound can be placed into container and thereafter the container 10 is rotated to uniformly coat the inside wall 12 of the container 10. Alternatively, the curable compound may be applied during a cooling cycle of a rotational moulding process.

Following application of the curable compound, the curable compound is cured by storing the container for the required interval, which is typically about 24 hours to create the low-permeability coating 14. Additional coats 14 may be applied in like fashion, according to the desired level of impermeability. After the container 10 is coated with the curable compound, no special storage conditions or additional storage space is required to accommodate the curing cycle since the curing is on the inside of the container 10.

EXAMPLES

Example One

Reaction Conditions

A composition comprising a solvated aromatic amine and a liquid carrier was prepared by loading suitable amounts each of an aromatic amine; at least one of an anhydride, an isocyanate or an acid; and a liquid carrier into a reaction vessel at room temperature and ambient pressure. The contents of the reaction vessel were mixed and the resulting reaction mixture heated to between 110-135° C. for approximately 10 minutes or until the set temperature was reached and melting and dissolution of amine was observed. In reactions involving trimethylene glycol di-p-amino benzoate (Versalink 740M, Air Products and Chemicals, Inc., Allentown, Pa.), the reaction mixture was heated to about 135° C. for approximately 25 minutes. Once the reaction mixture was clear, with no visible particles of the aromatic amine present, the reaction mixture was held at between 110-135° C. for approximately 10 minutes and cooled to room temperature.

Example 2

Solvation of Methylene Bis Methyl Anthranilate

Methylene bis methyl anthranilate (Polycure 1000, PTM&W Industries, Inc.; Santa Fe Springs, Calif.) was solvated using the anhydride methylhexahydrophthalic (MHHPA) and either a castor oil based carrier or a phthalate (di octyl phthalate) based carrier. The components of the resulting solvated systems are shown in Table 1. For solvated methylene bis methyl anthranilate composition comprising the castor oil based carrier, oleic acid was added to the composition after cooling to stabilize the composition.

TABLE 1

Methylene bis methyl anthranilate (Polycure 1000) solvated in two different carriers. The solvated methylene bis methyl anthranilate systems were prepared at 120-125° C. according to the procedure described in Example 1.

| CARRIER | POLYCURE 1000 (w/w %) | CARRIER (w/w %) | MHHPA (w/w %) | OLEIC ACID (w/w %) |
|---|---|---|---|---|
| Castor oil based | 38.67 | 53.33 | 5.33 | 2.67 |
| Phthalate based | 39.17 | 55.10 | 5.73 | Nil |

The solvated methylene bis methyl anthranilate systems described in Table 1 were blended with a commercially available prepolymer of toluene diisocyanate (TDI), at blend ratios of 100 g:85 g and 100 g:55 g (w/w) for compositions comprising the phthalate based carrier and the castor oil based carrier respectively, and cured at 100° C. for 8 hours. The physical properties of the resulting cured compound were evaluated and are shown in Table 3.

Methylene bis methyl anthranilate (Polycure 1000) was also solvated in other carriers at a reduced solids level of approximately 34% (see Table 2), with reduced viscosities (as determined by visual observation) as compared to the solvated compositions in Table 1. The viscosity of the castor oil based system at a 34% level of methylene bis methyl anthranilate (Polycure 1000) was measured at 8,000 centipoises. The solvated systems having reduced solid levels comprising the castor oil triol based carrier was evaluated in terms of its physical properties, the results are included in Table 3. The solvated systems having reduced solid levels was blended with toluene diisocyanate (TDI) at a blend ratio of 100 g:54 g (w/w).

TABLE 2

Methylene bis methyl anthranilate (Polycure 1000) solvated in three carriers at reduced solids level.

| CARRIER | POLYCURE 1000 (w/w %) | CARRIER (w/w %) | MHHPA (w/w %) |
|---|---|---|---|
| Castor oil triol | 33.82 | 60.30 | 5.88 |
| 2-ethylhexyl diphenyl phosphate | 33.82 | 60.30 | 5.88 |
| di octyl phthalate | 33.82 | 60.30 | 5.88 |

TABLE 3

A comparison of physical properties of TDI prepolymer cured with solvated methylene bis methyl anthranilate (Polycure 1000) in two carriers and methylene bis methyl anthranilate (Polycure 1000) solvated at a reduced level.

| SYSTEM | Pot life | Shore Hardness | Tensile Elongation (%) | Tensile Strength (psi) |
|---|---|---|---|---|
| *Castor oil based | 5 mins | 52D | 351 | 3,456 |
| *Phthalate based | 5 mins | 62D | 177 | 2,093 |
| **Castor oil triol based | 5 mins | 45D | 422 | 4,032 |

*Composition shown in Table 1
**Composition shown in Table 2
Pot life was measured by Test Method ERF 13-70.
Shore Hardness was measured by Test Method ASTM D2240.
Tensile Elongation was measured by Test Method ASTM D638.
Tensile Strength was measured by Test Method ASTM D638.

It was feasible to solvate methylene bis methyl anthranilate (Polycure 1000) in various carriers (reactive or unreactive with an isocyanate) at levels of 26-39% and anhydride level of 5-6%. The pot lives of such compositions were generally about 5 minutes.

Methylene bis methyl anthranilate (Polycure 1000) was solvated at 41% solids with caprolactone and MHHPA to yield compositions having a pot life of 10 minutes.

Example 3

Solvation of Methylene-Bis Chloroaniline (MOCA)

Three different solvated MOCA systems were developed and their compositions are shown in Table 4. Various combinations of carriers were used for enhanced stability of the solvated MOCA. Additionally, MOCA was blended with methylene bis methyl anthranilate (Polycure 1000) at a proportion of 35% to 5% (w/w), respectively, in an attempt to produce an amine hardener with a synergism of the properties of both MOCA and methylene bis methyl anthranilate (Polycure 1000). Typical viscosities of these systems were 2,000-3,000 centipoises.

TABLE 4

MOCA solvated in a mixture of carriers. These systems were prepared at 110-115° C. according to the procedure described earlier.

| SYSTEM | MOCA SOLID (w/w %) | *CARRIER A (w/w %) | *CARRIER B (w/w %) | CARRIER C (w/w %) | MHHPA (w/w %) |
|---|---|---|---|---|---|
| MOCA I | 40.00 | 28.50 | 28.50 | 0.00 | 3.00 |
| MOCA-POLYCURE I | **40.23 | 28.34 | 28.34 | 0.00 | 3.09 |
| MOCA-POLYCURE II | **40.23 | 0.00 | 0.00 | 56.69 | 3.08 |

*Carrier A - di octyl phthalate, Carrier B - dibasic ester and Carrier C - castor oil triol
**MOCA-35.21% and Polycure 1000-5.02%

The systems in Table 4 were also blended with a TDI pre polymer and cured at 100° C. for 8 hours. The following mix ratios of TDI pre polymer to hardener (MOCA solvated system) were used:

MOCA I: 100 g:71 g (w/w)
MOCA-POLYCURE Blend I: 100 g:73 g (w/w)
MOCA-POLYCURE Blend II: 100 g:47 g (w/w)

The physical properties of these materials are presented in Table 5.

TABLE 5

A comparison of physical properties of TDI pre polymer cured with solvated MOCA and MOCA/POLYCURE BLEND) in a mixture of carriers. Pot life, Shore Hardness, Tensile Elongation and Tensile Strength were measured as described above in Example 2.

| SYSTEM | Pot life | Shore Hardness | Tensile Elongation (%) | Tensile Strength (psi) |
|---|---|---|---|---|
| MOCA I | 5 mins | 65D | 313 | 4,154 |
| BLEND I | 5 mins | 66D | 330 | 4,196 |
| BLEND II | 5 mins | 50D | 327 | 4,720 |

Based on the results in Tables 2 and 5, the physical properties of TDI pre polymer cured using MOCA systems were generally higher than the methylene bis methyl anthranilate (Polycure 1000) solvated systems. Also, MOCA could be solvated in various carriers to a level of 47%; although the higher levels of anhydride in these systems reduced pot life. A typical formulation at 47% MOCA loading is presented in Table 6.

TABLE 6

MOCA solvated in castor oil. Other carriers used at this level of loading were 2-ethylhexyl diphenyl phosphate, and di octyl phthalate. These systems were prepared at 110-115° C. according to the procedure described in Example 1.

| CARRIER | MOCA SOLID (w/w %) | CARRIER (w/w %) | MHHPA (w/w %) |
|---|---|---|---|
| Castor oil | 46.66 | 46.67 | 6.67 |

When MOCA was blended with methylene bis methyl anthranilate (Polycure 1000) and solvated in a similar carrier as MOCA alone, the blending tended to stabilize the solvated system at a reduced level of anhydride of 3%.

Changing the type of anhydride from MHHPA to Dodecenyl Succinic anhydride (DDSA) did not change the pot lives of these systems. Solvating of MOCA at 47% was feasible with 6.7% DDSA. A check of the pH of MOCA solvated at 47% at anhydride loading of 6.7% gave a pH value of 4.36 compared to a value of 5.42 for commercial dispersion of methylene bis methyl anthranilate (Polycure 1000). An increase of the pH to 5.42 may improve the pot lives of these solvated amines.

MOCA was also solvated using caprolactone wherein the MOCA is at percent solid ranging from 40%-60%. The pot life ranged from 48 minutes to 27 minutes depending on the % solid.

Example 4

Physical Properties of Cured Products Prepared Using Solvated MOCA Systems and TDI Prepolymers A various solvated system comprising MOCA, caprolactone, MHHPA and optionally citric acid (w/w %), were cured with a TDI prepolymer using with same processing conditions as set out in Example 3. Pot life, Shore Hardness, Tensile Elongation and Tensile Strength for the resulting cured products were measured as described above in Example 2. The physical properties of the cured products are set out below. The measured physical properties of the cured products fell within acceptable target ranges.

55% MOCA:45% Caprolactone
Tensile strength: 4386 psi
Tensile elongation: 351%
Pot life: 22 mins
Hardness: 55 D
60% MOCA:40% Caprolactone
Tensile strength: 4650 psi
Tensile elongation: 329%
Pot life: 14 mins
Hardness: 54 D
65% MOCA:34.8%:Caprolactone:0.2% citric acid
Tensile strength: 4660 psi
Tensile elongation: 330%
Pot life: 8 mins
Hardness: 65 D Example 5

Solvation of Methylene Bis Chlorodiethylbenzamine (Lonzacure MCDEA-GS)

Methylene bis chlorodiethylbenzamine (Lonzacure MCDEA-GS, Lonza, Basel, Switzerland) was solvated at two different levels in di butyl phthalate at 40% and 45% solids, at MHHPA levels of 1% and 1.55%, respectively. The compositions of the solvated Lonzacure MCDEA-GS systems are shown in Table 7. The amine could also be solvated with di octyl phthalate.

TABLE 7

Lonzacure MCDEA-GS solvated at two different levels in similar carriers (di butyl phthalate) These systems were prepared at 105-110° C. according to the procedure described in Example 1.

| SYSTEM | LONZACURE SOLID (w/w %) | CARRIER (w/w %) | MHHPA (w/w %) |
|---|---|---|---|
| Lonzacure I | 40.43 | 58.56 | 1.01 |
| Lonzacure II | 45.44 | 53.01 | 1.55 |

Additionally, this amine could be solvated in other carriers. The amine Lonzacure MCDEA-GS solvated more easily compared to the other aromatic amines. It could be solvated at levels of 40-60% level depending on the type of carrier and MHHPA level (1-6%). Typical viscosities of these systems were 2,000-3,500 centipoises. At reduced level of MHHPA of 1% in various phthalates based carriers, the pot life of these solvated systems improved to 8 minutes.

A check of the pH of Lonzacure MCDEA-GS solvated at 40% at anhydride loading of 3% gave a pH value of 4.34 compared to a value of 4.36 for MOCA at 47% and anhydride level of 6.7% and 5.42 for commercial Polycure dispersion, CLH 6292. Increasing the pH to 5.42 may improve pot lives of these solvated systems.

With the use of caprolactone as the carrier, Lonzacure MCDEA-GS was solvated at 40-50% solids, with a pot life of 10-15 minutes.

Example 6

Physical Properties of Cured Products Prepared Using Solvated Methylene Bis Chlorodiethylbenzamine (Lonzacure MCDEA-GS) Systems and TDI Prepolymers A solvated system comprising 55% methylene bis chlorodiethylbenzamine (Lonzacure MCDEA-GS), 1-1.5% MHHPA, and 45% caprolactone (w/w %) were cured with a TDI prepolymer using with same processing conditions as set out in Example 5. Pot life, Shore Hardness, Tensile Elongation and Tensile Strength for the resulting cured product were measured as described above in Example 2. The physical properties of the cured product are set out below. The measured physical properties of the cured products fell within acceptable target ranges.

Tensile strength: 4462 psi
Tensile elongation: 248%
Pot life: 10 mins
Hardness 64 D Example 7

Physical Properties of Cured Products Prepared Using Solvated Trimethylene Glycol di-p-amino Benzoate (Versalink 740M) Systems and MDI Prepolymers Trimethylene glycol di-p-amino benzoate (Versalink 740M) was solvated at 35% in Caprolactone monomer using 0.5% citric acid, and cured with a methylene diisocyanate (MDI) prepolymer. Pot life, Shore Hardness, Tensile Elongation and Tensile Strength for the resulting cured product were measured as described above in Example 2. The physical properties of the cured product are set out below. The measured physical properties of the cured products fell within acceptable target ranges.

Tensile strength: 4861 psi
Tensile elongation: 1261%
Shore Hardness: 95 A
Pot life: 8 mins

Example 8

Solvation of Trimethylene Glycol di-p-amino Benzoate (Versalink 740M)

Trimethylene glycol di-p-amino benzoate (Versalink 740M) was solvated in caprolactone (50% w/w), 4,4'-diaminodiphenyl sulfone (10% w/w) with an IPDI level of 5% w/w. This formulation when reacted with a MDI prepolymer in a stoichiometric ratio and had a pot life of 15 minutes and the resulting cured product had a Shore hardness of 95 A.

The addition of 4,4'-diaminodiphenyl sulfone was found to lower the formulation viscosity. Furthermore, as the 4,4'-diaminodiphenyl sulfone also reacts with the isocyanate, the cured product has improved chemical resistance as compared to cured products prepared using solvated Versalink 740M systems without 4,4'-diaminodiphenyl sulfone.

Example 9

Gasoline Resistant Coating Comprising a Solvated Trimethylene Glycol di-p-amino Benzoate Cured with MDI Prepolymers The solvated trimethylene glycol di-p-amino benzoate system of Example 8 was cured with an MDI prepolymer in a stoichiometric ratio. The resulting cured product was found to have excellent gas permeation resistance along with excellent low temperature impact strength.

Although the invention has been described with reference to illustrative embodiments, it is to be understood that the invention is not limited to these precise embodiments, and that various changes and modification are to be intended to be encompassed in the appended claims.

We claim:

1. A curable compound comprising:
    a resin; and
    a hardener, said hardener comprising a composition comprising a solvated aromatic amine and a liquid carrier, wherein said solvated aromatic amine is the reaction product of an aromatic amine and at least one of an anhydride, or an acid in the liquid carrier, and wherein said aromatic amine is diphenyl aromatic amine, trimethylene glycol di-p-amino benzoate, methylene his methyl anthranilate, methylene-bis chloroaniline, methylene his chlorodiethylbenzamine or a combination thereof,
    said anhydride is methylhexahydrophthalic anhydride, dodecenyl succinic anhydride, nadic methyl anhydride or a combination thereof,
    said acid is oleic acid or citric acid, and
    said liquid carrier is a non-volatile liquid carrier.

2. The curable compound according to claim 1, wherein the resin comprises isocyanate.

3. The curable compound according to claim 2, wherein the isocyanate is methylene diisocyanate, toluene diisocyanate, isophorone diisocyanate, associated prepolymers thereof and combinations thereof.

4. The curable compound according to claim 1, wherein the composition comprising the solvated aromatic amine and the liquid carrier is prepared in accordance with a method comprising
    providing a reaction mixture comprising:
        a) said aromatic amine,
        b) said anhydride or acid,
        and
        c) said liquid carrier;
    and
    heating the reaction mixture at an elevated temperature, wherein the elevated temperature is the temperature at which the aromatic amine is solvated by the liquid carrier.

5. The curable compound according to claim 1, further comprising at least one low molecular weight polyol.

6. A composition comprising a solvated aromatic amine and a liquid carrier;
    wherein said solvated aromatic amine is the reaction product of an aromatic amine and at least one of an anhydride, or an acid in the liquid carrier,
    wherein said aromatic amine is diphenyl aromatic amine, trimethylene glycol di-p-amino benzoate, methylene bis methyl anthranilate, methylene-bis chloroaniline, methylene his chlorodiethylbenzamine or a combination thereof;
    wherein the anhydride is methylhexahydrophthalic anhydride, dodecenyl succinic anhydride, nadic methyl anhydride or a combination thereof;
    wherein said acid is oleic acid or citric acid; and
    wherein said liquid carrier is a non-volatile liquid carrier.

7. The composition according to claim 6, wherein the non-volatile liquid carrier comprises castor oil, castor oil triol, di octyl phthalate, 2-ethylhexyl diphenyl phosphate, dibasic ester, di butyl phthalate, polyether polyol, caprolactone, propylene carbonate or combinations thereof.

8. A composition according to claim 6, wherein the composition is prepared in accordance with a method comprising:
    providing a reaction mixture comprising:
        a) said aromatic amine,
        b) said anhydride or acid
        c) said liquid carrier;
    and
    heating the reaction mixture at an elevated temperature, wherein the elevated temperature is the temperature at which the aromatic amine is solvated by the liquid carrier.

9. A method of preparing a composition comprising a solvated aromatic amine and a liquid carrier, said method comprising the steps of:
    providing a reaction mixture comprising:
        a) an aromatic amine, wherein the aromatic amine is diphenyl aromatic amine, trimethylene glycol di-p-amino benzoate, methylene bis methyl anthranilate, methylene-bis chloroaniline, methylene bis chlorodiethylbenzamine or a combination thereof;
        b) at least one of an anhydride, or an acid,
        wherein the anhydride is methylhexahydrophthalic anhydride, dodecenyl succinic anhydride, nadic methyl anhydride or a combination thereof,
        and
        wherein the acid is oleic acid or citric acid; and
        c) a liquid carrier;
    and
    heating the reaction mixture at an elevated temperature, wherein the elevated temperature is the temperature at which the aromatic amine is solvated by the liquid carrier.

10. The method according to claim 9, wherein the liquid carrier is a non-volatile liquid carrier.

11. The method according to claim 10, wherein the non-volatile liquid carrier comprises castor oil, castor oil triol, di octyl phthalate, 2-ethylhexyl diphenyl phosphate, dibasic ester, di butyl phthalate, polyether polyol, caprolactone, propylene carbonate or combinations thereof.

12. The method according to claim 9, wherein the amount of the aromatic amine in the reaction mixture is about 30% to about 60% w/w.

13. The method according to claim 9, wherein the amount of the anhydride, or the acid in the reaction mixture is about 0.1% to about 10% w/w.

14. The method according to claim 9, wherein the amount of the liquid carrier in the reaction mixture is about 30% to about 60% w/w.

15. The method according to claim 9, wherein the elevated temperature is between about 100° C. to about 135° C.

16. The method according to claim 15, wherein the elevated temperature is about 110° C.

17. The method according to claim 16, wherein a nitrogen blanket is provided over the reaction mixture.

18. A method of decreasing gasoline permeability of a container, comprising the steps:

coating an inside surface of the container with a curable compound comprising a resin and a hardener, said hardener comprising a composition comprising a solvated aromatic amine and a liquid carrier, wherein said solvated aromatic amine is the reaction product of an aromatic amine and at least one of an anhydride, or an acid in the liquid carrier, and wherein said aromatic amine is diphenyl aromatic amine, trimethylene glycol di-p-amino benzoate, methylene bis methyl anthranilate, methylene-bis chloroaniline, methylene bis chlorodiethylbenzamine or a combination thereof; said anhydride is methylhexahydrophthalic anhydride, dodecenyl succinic anhydride, nadic methyl anhydride or a combination thereof; said acid is oleic acid or citric acid; and said liquid carrier is a non-volatile liquid carrier;

and curing the curable compound to provide a gasoline resistant coating.

19. The method according to claim 18, wherein the composition comprising the solvated aromatic amine and the liquid carrier is prepared in accordance with a method comprising providing a reaction mixture comprising:
  a) said aromatic amine
  b) said anhydride acid,
  c) said liquid carrier;

and heating the reaction mixture at an elevated temperature, wherein the elevated temperature is the temperature at which the aromatic amine is solvated by the liquid carrier.

20. The method of claim 19, wherein the gasoline resistant coating decreases gasoline permeability of the container to below about 1.5 $g/m^2/day$.

* * * * *

UNITED STATES PATENT AND TRADEMARK OFFICE
CERTIFICATE OF CORRECTION

PATENT NO.           : 8,748,540 B2
APPLICATION NO.      : 13/264962
DATED                : June 10, 2014
INVENTOR(S)          : John Ulcar and Ackah Toffey It is certified that error appears in the above-identified patent and that said Letters Patent is hereby corrected as shown below:

In the Claims

Claim 1, Column 13, lines 41-42, please delete "methylene his methyl anthranilate" and insert --methylene bis methyl anthranilate--

Claim 1, Column 13, lines 42-43, please delete "methylene his chlorodiethylbenzamine" and insert --methylene bis chlorodiethylbenzamine--

Claim 6, Column 14, lines 10-11, please delete "methylene his chlorodiethylbenzamine" and insert --methylene bis chlorodiethylbenzamine--

Signed and Sealed this
Twenty-third Day of September, 2014

Michelle K. Lee
*Deputy Director of the United States Patent and Trademark Office*